United States Patent
Chiang

(10) Patent No.: US 6,549,501 B2
(45) Date of Patent: Apr. 15, 2003

(54) METHOD FOR ADJUSTING REFLECTIVE LIGHT DISTURBANCE OPTICAL DISK DRIVE

(75) Inventor: Jen-Cheng Chiang, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 97 days.

(21) Appl. No.: 09/901,710

(22) Filed: Jul. 11, 2001

(65) Prior Publication Data

US 2003/0012108 A1 Jan. 16, 2003

(51) Int. Cl.$^7$ ................................................ G11B 7/00
(52) U.S. Cl. ..................... 369/53.27; 369/53.1; 369/116
(58) Field of Search ............................. 369/47.1, 47.5, 369/47.53, 53.1, 53.11, 53.27, 44.34, 44.27, 59.1, 59.11, 116

(56) References Cited

U.S. PATENT DOCUMENTS 5,341,360 A * 8/1994 Johann et al. ............ 369/47.53
5,446,716 A * 8/1995 Eastman et al. .......... 369/47.51

* cited by examiner

Primary Examiner—Muhammad Edun
(74) Attorney, Agent, or Firm—Rosenberg, Klein & Lee

(57) ABSTRACT

The present invention discloses a method for adjusting the difference of the reflective light disturbance for a light source of an optical disk drive when there is and is not an optical disk in the optical disk drive. This method is used to adjust the illumination parameters of the laser diode of an optical disk drive; wherein the no disc is used for rough tuning to obtain a preliminary value for the illumination parameter. After inserting an optical disk into the drive, a quick sample is taken again between the illumination power controller and the high level amplifier. After computing with the preliminary value of the illumination parameter, the influence value of the reflective light of the laser light source as it is to the illumination parameter when there is an optical disk in the drive. The result is sent to the compensating device to compensate in proportion and process feedback adjustment in order to obtain the laser stable illumination parameter which is affected by the reflective light of the optical disk, and save such stable illumination parameter in the memory as the illumination control parameter when the optical disk drive writes in data, and further to attain the purpose of adjusting the reflective light disturbance of the laser on the optical disk.

3 Claims, 5 Drawing Sheets

METHOD FOR ADJUSTING REFLECTIVE LIGHT DISTURBANCE OPTICAL DISK DRIVE

BACKGROUND OF THE INVENTION

1. Field of the Invention

The present invention relates to a method for eliminating the reflective light disturbance of an optical disk affected by the light source of the optical disk drive, more particularly to a method used to adjust the illumination light source power parameter and adjust the reflective disturbance by dynamic feedback.

2. Description of the Prior Art

Optical disk drives are widely used in audio and video equipments in our daily life and computers information equipment as well, serving as the major equipment for playing the audio and video data and reading data from the computer. However, the components of the mechanism of the optical disk drive used for reading or writing data are illuminated laser components. The intensity of the light source determines the quality of reading and writing data; therefore the adjustment of the illuminating parameters of the laser components becomes extremely important.

The direct electric power relation value for the laser components' illumination of a traditional optical disk drive is measured in milliwatt (mw), which uses the unit of power to represent its output brightness or output parameter, and the whole laser component's illumination parameter is measured in milliwatt/ampere (MW/A) to represent its relative relation of output with respect to its input. Such value is generally considered as an electric voltage and such relation is briefly disclosed in FIG. 4; wherein the main electric power of the laser component A is an electric current I of a specific value, and the light source Pw emitted from the laser component A is exactly the above-mentioned output electric power value. In the reading or writing mode, the light source Pw passes through a set of lenses L1 and L2 and focuses at an optical disk B and makes the optical disk to generate a reflection. Such reflection P' is used by the light sensor (not shown in the figure) as a reference for reading data, some of the reflective light P' will reflect directly along the opposite direction of the original emission path back to the laser component A and it causes a noice to the power output of the output light source Pw. Such phenomenon is generally called reflection feedback. Therefore, the reflection feedback is listed as the key point for adjusting the illumination parameter in the reading and writing control system of an optical disk drive.

In FIG. 5, it shows a typical prior art of the automatic power control (APC) for the light source of a writable optical disk drive. Such system is used to describe the effect of the reflection feedback phenomenon, wherein the FPDO input value represents the power control parameter, elementary amplifiers R1 and R2 respectively represent the signal amplified units for the reading and writing systems of such optical disk drive, the controller PI and PI' respectively represent the control unit for the light source control signal for controlling the output signal of the reading and writing of the optical disk drive, and the control signals are Vr and Vw, and the sampled signals are S1 and S2 which represent the sampled values for the reading and writing signals respectively. The reflective light disturbance caused by the emitting end of the laser component A has a reflection feedback value which is represented by dV, and the power value of the light source Pw and the noise N1 are computed by a monitor MD through feedback as an input value FPDO. Therefore, the disclosure of the APC system of the traditional optical disk drive as shown in FIG. 5 clearly shows that the reflective light disturbance value dV has a bad influence to the system stability, and the industry generally does not have a good adjusting method for such reflective light disturbance value dV. The difficulty is that such reflective light disturbance value dV is not a constant, and it varies according to the intensity of the light source Pw, and the quality of the signal pick-up head (such as the light sensor) and the layout of the printed circuit board. It means that the reflective light disturbance value dV are not consistently the same, and cannot be adjusted by a unified reference value derived from experience. Furthermore, the adjustment of such reflective light disturbance value dV has to be carried out when there is an optical disk acting as the reflection source. If there is no optical disk in the drive, the traditional adjustment method makes use of the monitor MD for adjustment. But since the factor of the reflective light disturbance is hidden, therefore the result of the adjustment is usually obtained from experienced values. Once the optical disk drive products are produced for accommodating an optical disk for reading and writing, the disk drive cannot accurately compensate or eliminate the reflective light feedback phenomenon because of the different reflective light for different optical disks. The adjusted system does not completely fit the reading and writing operations for all optical disks therefore occasionally it may have jumping tracks and is unable to read or write data accurately.

Further, if we consider to insert the optical disks one by one into the disk drive and obtain the actual reflective light disturbance value dV by adjusting the monitor MD, the intensity before the adjustment for the light source Pw cannot be controlled, so that the light source Pw causes the improper gathering of energy to focus at a point on the optical disk due to output power, and result in damage similar to punch holes, and burn the surface of the optical disk. It consumes a great deal of adjusting materials and costs, which is not commercially useful for the industry and not economically efficient. Further, the final adjusted result does not necessarily comply with the reading and writing operations for all optical disks.

SUMMARY OF THE INVENTION

The primary objective of the present invention is to provide a method for adjusting the reflective light disturbance for an optical disk drive by obtaining the preliminary parameters when the optical disk is not inserted into the disk drive, and then obtaining the illumination parameter through the dynamic feedback before the writing operation with the insertion of the optical disk, and adjusting the illumination intensity and illumination parameter for the laser light source, so that the reading and writing operations will not be affected by the reflective light disturbance.

A further objective of the present invention is to provide a method for adjusting the reflective light disturbance for an optical disk drive by obtaining an accurate and stable feedback adjustment parameters, so that it accomplishes the stable value for the illumination parameter of the laser light source in order to facilitate the recording in the memory for use.

Another objective of the present invention is to provide a method for adjusting the reflective light disturbance for an optical disk drive that does not need to consume a great deal of optical disk adjustment, and save the adjustment time and cost, and the instant adjustment due to the environment at different time.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
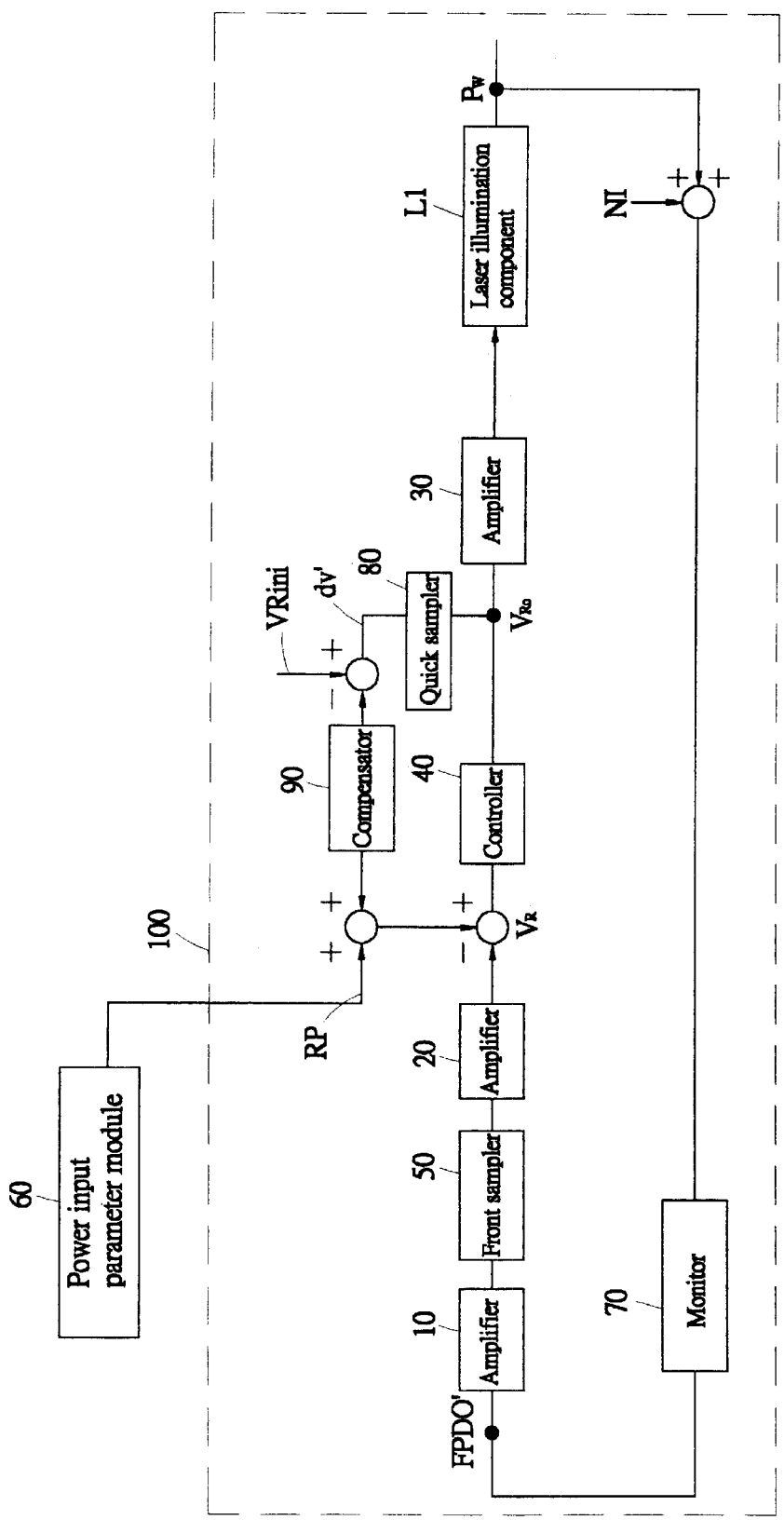
FIG. 1 is a block diagram of the control system according to the present invention.

Please refer to FIG. 1 for the block diagram of the system control according to the present invention, wherein the input value FPDO' of the illumination control system 100 represents the total input power parameter of the laser emitting component L1 for the optical disk drive, and the amplifiers 10, 20, and 30 respectively represent the front, middle, and rear amplifying component, and the controller 40 is the major illumination parameter of the computing unit. The front sampler 50 represents the preliminary sampling component of the illumination parameter under reading status, which is generally called S.H.R. (Sample and Hold For Read), and the power parameter input module 60 is used to input illumination parameter. The monitor 70 is also a prior art system component; therefore its architecture and principle will not be described here. The noise N1 is the prior-art noise interference that affects the signal operation of the optical disk drive.

Figure 2:
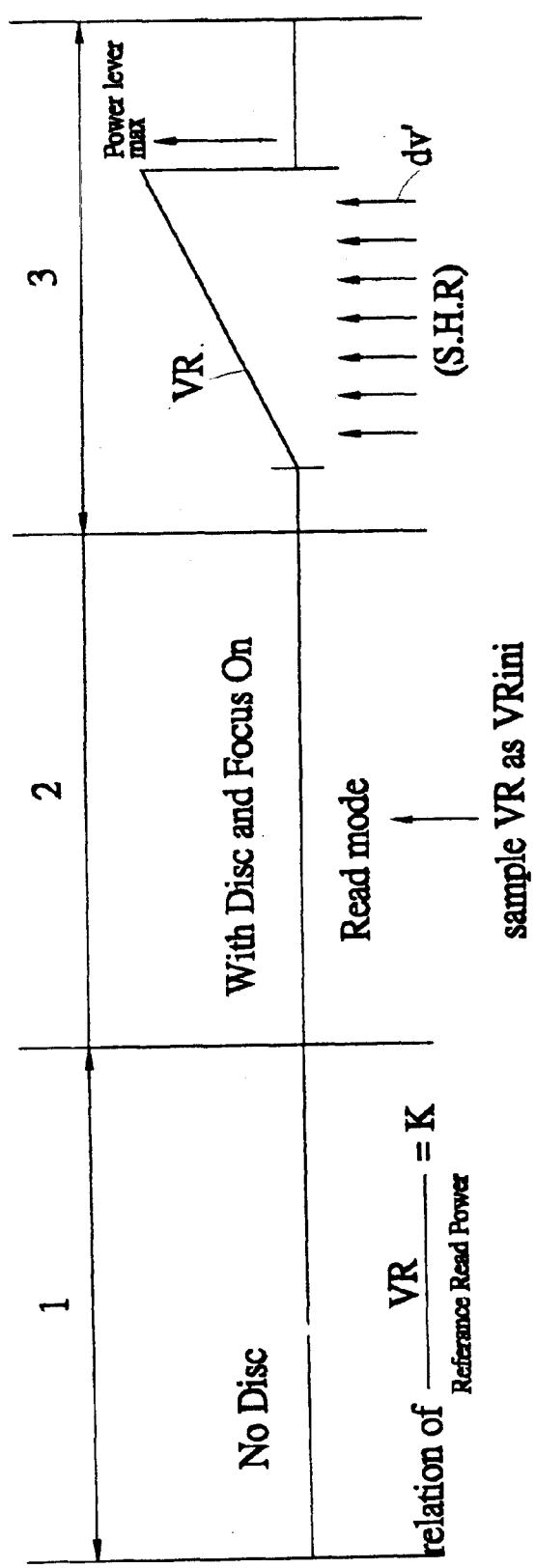
FIG. 2 is a waveform diagram of the quick sampling for reading the illumination parameter according to the present invention.

Please refer to FIG. 2 together with FIG. 1 that shows the system block. A quick sampler 80 being disposed between a controller 40 and a rear amplifier 30 can take a quick sample for the illumination parameter of the output of the controller 40, and the waveform diagram of the sample is shown in FIG. 2 wherein the output illumination parameter VRo represents the illumination control signal output from the controller 40 to the amplifier 30, which is also the final output parameter. In the instance of its output, the quick sampler 80 will take quick sample, and the sampling cycle is the working cycle of the front sampler. After the sampling, a reflective light influence value dv' is computed with an initial illumination parameter VRini, and sent to a compensator 90 for proportional compensation. The compensation proportion can be defined as 1/k first. The initial illumination parameter VRini and the compensation proportion value 1/k will be described in detail in later section. After the compensator 90 is computed with the read power parameter RP, the feedback to the output of the front and the middle amplifiers 20 at the input end of the controller 40 is computed, and then is input to the controller 40. Therefore, by means of the architecture of such quick sampling, compensation, and feedback, it can stabilize the value of the illumination parameter input from the controller 40.

Figure 3:
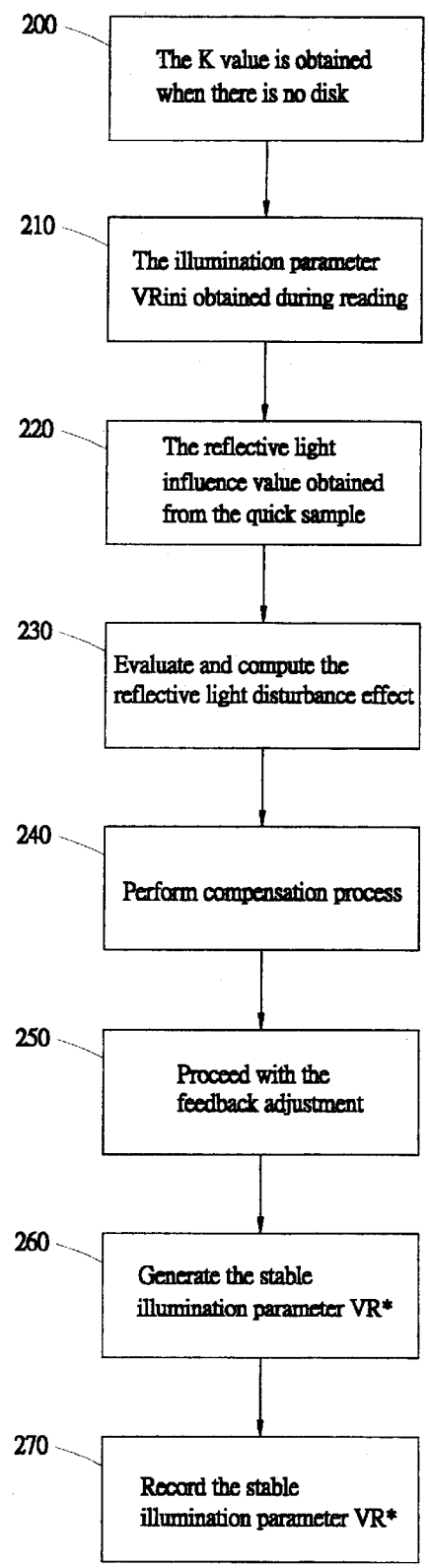
FIG. 3 is a flowchart showing the adjustment of the laser illumination parameters according to the present invention.
Figure 4:
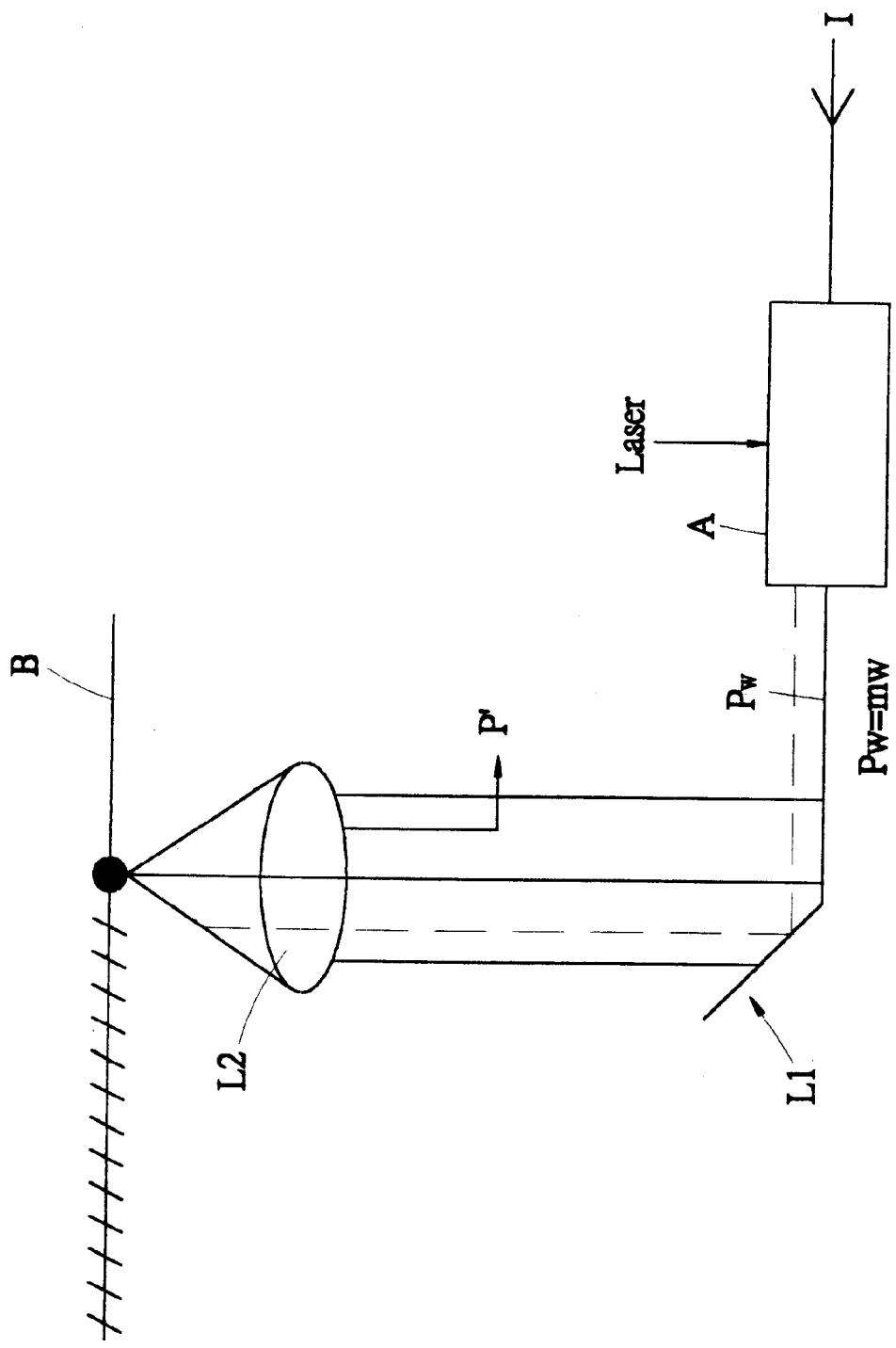
FIG. 4 is an illustrative diagram showing the reflective light feedback during the prior-art laser component illumination.
Figure 5:
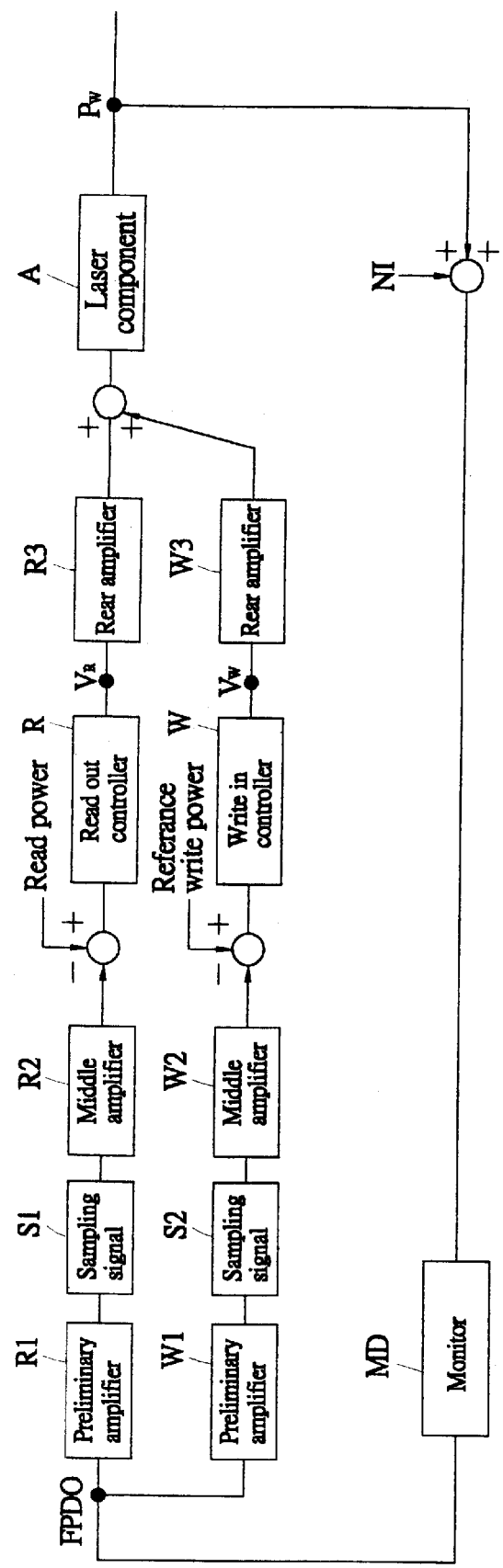
FIG. 5 is a system block diagram of a prior-art optical disk drive's light source automatic power control (APC)

Please refer to FIG. 3, which shows the flowchart according to the present invention and the procedure includes the following steps:

(200) The K value is obtained when there is no disk;
((210) The illumination parameter VRini obtained during reading;
(220) The reflective light influence value obtained from the quick sample;
(230) Evaluate and compute the reflective light disturbance effect;
(240) Perform compensation process;
(250) Proceed with the feedback adjustment;
(260) Generate the stable illumination parameter VR*; and
(270) Record the stable illumination parameter VR*.

Wherein, the initial illumination parameter VRini in the step 210 is by inserting the optical disk into the drive and performing adjustment to the laser illumination component L during reading, and then obtaining the initial numeric value of the reflective light status for the laser illumination component L when reading data. Further, the quick sampling process in Step 220 proceeds with the quick sampling for the instant output and write in the illumination parameter by the quick sampler 80 to the controller 40 in order to obtain the reflective light influence value dv', and such initial illumination parameter VRini is computed and evaluated to obtain the reflective influence evaluation. By means of the processing of Step 240, the evaluated result is sent to the compensator 40 for the proportional compensation and operation, and such compensation proportion value 1/K is the value for reading the power parameter RP/output illumination parameter VR. This proportional compensation mode works together with the feedback adjustment of Step 250 to process the compensation. The result is computed with the power parameter of middle amplifiers 20 to obtain a stable illumination parameter VR*, being sent to the controller 40. Therefore, the controller 40 can output a more stable and output illumination parameter VRo which will not be affected by the reflective light for the writing. It also provides memory in the control IC of the optical disk drive for the recording.

The laser illumination component L of the optical disk drive does not require insertion of the disk into the drive for the stable adjustment of the illumination parameter. The method totally eliminates and compensates the reflective light phenomenon for the practical application on the data reading mode of the optical disk. Since the quick sampler 80 and the compensator 90 constitute a quick sampling feedback adjustment circuit, the illumination control system of the entire laser emitting component L in the practical application while the optical disk is inserted into the disk for data reading such that the laser illumination component L illumination output power for the reflective light phenomenon can be automatically eliminated and accurately compensated. It can also obtain its stable illumination parameter, and further save the time and cost for the adjustment of the illumination parameter of the optical disk. In another words, it is a method that automatically evaluates and compensates the write in reflective light disturbance phenomenon and the feedback generates a stable illumination parameter, provided the optical disk is inserted into the disk.

What is claimed is:

1. A method for adjusting reflective light disturbance of a light source of an optical disk, comprising the following steps: roughly tuning for a design value of a compensatory with no disk; obtaining an initial illumination parameter of the laser light source during data reading; performing a quick sampling between a light source power controller and a rear amplifier of the illumination control system of a laser illumination component; computing the result with the initial illumination parameter; obtaining an influence value of the illumination parameter as to the laser light reflection; sending the result to a compensator for proportional compensation and feedback correction to obtain a stable illumination parameter that is not affected by the reflective light; and recording said stable illumination parameter in a memory as an illumination control parameter for the data reading of the optical disk drive.

2. A method for adjusting reflective light disturbance of a light source of an optical disk as claimed in claim 1, wherein said quick sampling process step between the light power controller and the rear amplifier is executed by a fast sampler.

3. A method for adjusting reflective light disturbance of a light source of an optical disk as claimed in claim 1, said proportional compensation step for the compensator having a proportional compensation value as the reading of the power parameter and the output illumination parameter for the laser illumination component.

* * * * *